(12) United States Patent
Omi

(10) Patent No.: US 7,742,692 B2
(45) Date of Patent: Jun. 22, 2010

(54) VIBRATION REDUCTION MECHANISM AND OPTICAL DEVICE

(75) Inventor: Junichi Omi, Yokohama (JP)

(73) Assignee: Nikon Corporation, Tokyo (JP)

( * ) Notice: Subject to any disclaimer, the term of this patent is extended or adjusted under 35 U.S.C. 154(b) by 249 days.

(21) Appl. No.: 11/907,290

(22) Filed: Oct. 10, 2007

(65) Prior Publication Data

US 2008/0088927 A1    Apr. 17, 2008

(30) Foreign Application Priority Data

Oct. 13, 2006    (JP)    ............................ 2006-279579

(51) Int. Cl.
  *G03B 17/00*    (2006.01)
  *H04N 5/228*    (2006.01)
(52) U.S. Cl. ..................... 396/55; 348/208.7
(58) Field of Classification Search ................... 396/55, 396/52; 348/208.99, 208.2, 208.5, 208.7, 348/208.11; 359/554
See application file for complete search history.

(56) References Cited

U.S. PATENT DOCUMENTS

| 5,172,276 A | 12/1992 | Ueyama et al. | ............. 359/813 |
| 5,831,671 A | 11/1998 | Chigira et al. | .............. 348/208 |
| 5,854,947 A | 12/1998 | Imura | ........................... 396/55 |
| 6,064,827 A | 5/2000 | Toyoda | ........................ 396/55 |
| 2006/0204233 A1 | 9/2006 | Miyamoto | .................... 396/55 |

FOREIGN PATENT DOCUMENTS

CN    1831622 A    9/2006
JP    10-3102    1/1998

OTHER PUBLICATIONS

Extended European Search Report issued in corresponding European Patent Application No. 07118282.8, on Feb. 26, 2008.
Chinese Office Action issued Feb. 12, 2010 in corresponding Chinese Patent Application 2007101811827.

*Primary Examiner*—Rochelle-Ann J Blackman

(57) ABSTRACT

A vibration reduction mechanism, comprising: a first moving member and a second moving member which move relatively at a time of image blur correction; a guide member which guides relative movements of the first moving member and the second moving member; a plurality of first engagement portions, aligned in a row, which engage the first moving member with the guide member by spherical or cylindrical surfaces and groove-shaped portions; and a plurality of second engagement portions, aligned in a row, which engage the second moving member with the guide member by spherical or cylindrical surfaces and groove-shaped portions, wherein a groove shape of at least either one of the plurality of the first engagement portions or the plurality of the second engagement portions is formed with an elongated hole shape extending along an alignment direction of the first engagement portions aligned in a row.

23 Claims, 6 Drawing Sheets

VIBRATION REDUCTION MECHANISM AND OPTICAL DEVICE

The disclosure of the following priority applications is herein incorporated by reference: Japanese Patent Application No. 2006-279579 filed on Oct. 13, 2006.

BACKGROUND OF THE INVENTION

1. Field of the Invention

The present invention relates to a vibration reduction mechanism having a mechanism to correct blur of an optical system and an optical device using the vibration reduction mechanism.

2. Description of Related Art

There is known an optical device provided with a vibration reduction mechanism, in which a lens frame body is movable along a prescribed direction by sliding on a guide axis and rotates around the guide axis so that lens is supported to be movable along a direction perpendicular to the prescribed direction (for example, refer to Japanese Unexamined Patent Application Publication No. H10-3102).

However, the above-mentioned vibration reduction mechanism has the disadvantage of including many constituent mechanical elements, thereby resulting in an insufficient regulation of the rotation of the lens frame body, due to errors and looseness between the constituent mechanical elements, which may be detrimental to the accuracy of the driving control of the vibration reduction mechanism.

SUMMARY OF THE INVENTION

An object of the present invention is to provide a vibration reduction mechanism having a guide mechanism to guide a lens frame body, with a simple structure, and with high accuracy, and further to provide an optical device using the same.

The present invention solves the above-mentioned problems in accordance with the following solving means.

According to the first aspect of the present invention, a vibration reduction mechanism, comprises: a first moving member and a second moving member which move relatively at a time of blur correction; a guide member which guides relative movement of the first moving member and the second moving member; a plurality of first engagement portions, aligned in a row, which engage the first moving member and the guide member by spherical or cylindrical surfaces and groove-shaped portions; and a plurality of second engagement portions, aligned in a row, which engage the second moving member with the guide member by spherical or cylindrical surfaces and groove-shaped portions, wherein a groove shape of at least either one of the plurality of the first engagement portions or the plurality of the second engagement portions is formed with an elongated hole shape extending along an alignment direction of the first engagement portions aligned in a row.

In the vibration reduction mechanism the spherical, cylindrical surface, or groove-shaped portions of the first engagement portion and the second engagement portion may be integrally formed with the guide member.

The vibration reduction mechanism may further comprises one or more regulation portions between the first or second moving member and the guide member to regulate the relative movements along the alignment direction of the plurality of the first engagement portions aligned in a row.

According to the second aspect of the present invention, an optical device, includes a vibration reduction mechanism, comprising: a first moving member and a second moving member which move relatively at a time of image blur correction; a guide member which guides relative movements of the first moving member and the second moving member; a plurality of first engagement portions, aligned in a row, which engage the first moving member with the guide member by spherical or cylindrical surfaces and groove-shaped portions; and a plurality of second engagement portions, aligned in a row, which engage the second moving member with the guide member by spherical or cylindrical surfaces and groove-shaped.

In accordance with the present invention, there are provided, in the vibration reduction mechanism, the first and second engagement portions, both having groove-shaped portions to engage with the spherical or cylindrical-shaped portions of the following guide member, the above-mentioned first and second engagement portions being disposed both between the guide member and the first moving member and between the guide member and the second moving member. Therefore, the first and second moving members can be relatively moved by means of a simple structure along a two-axis direction, without any relative rotation, with a constant orientation, and with a precise accuracy.

DETAILED DESCRIPTION OF THE INVENTION

Figure 1:
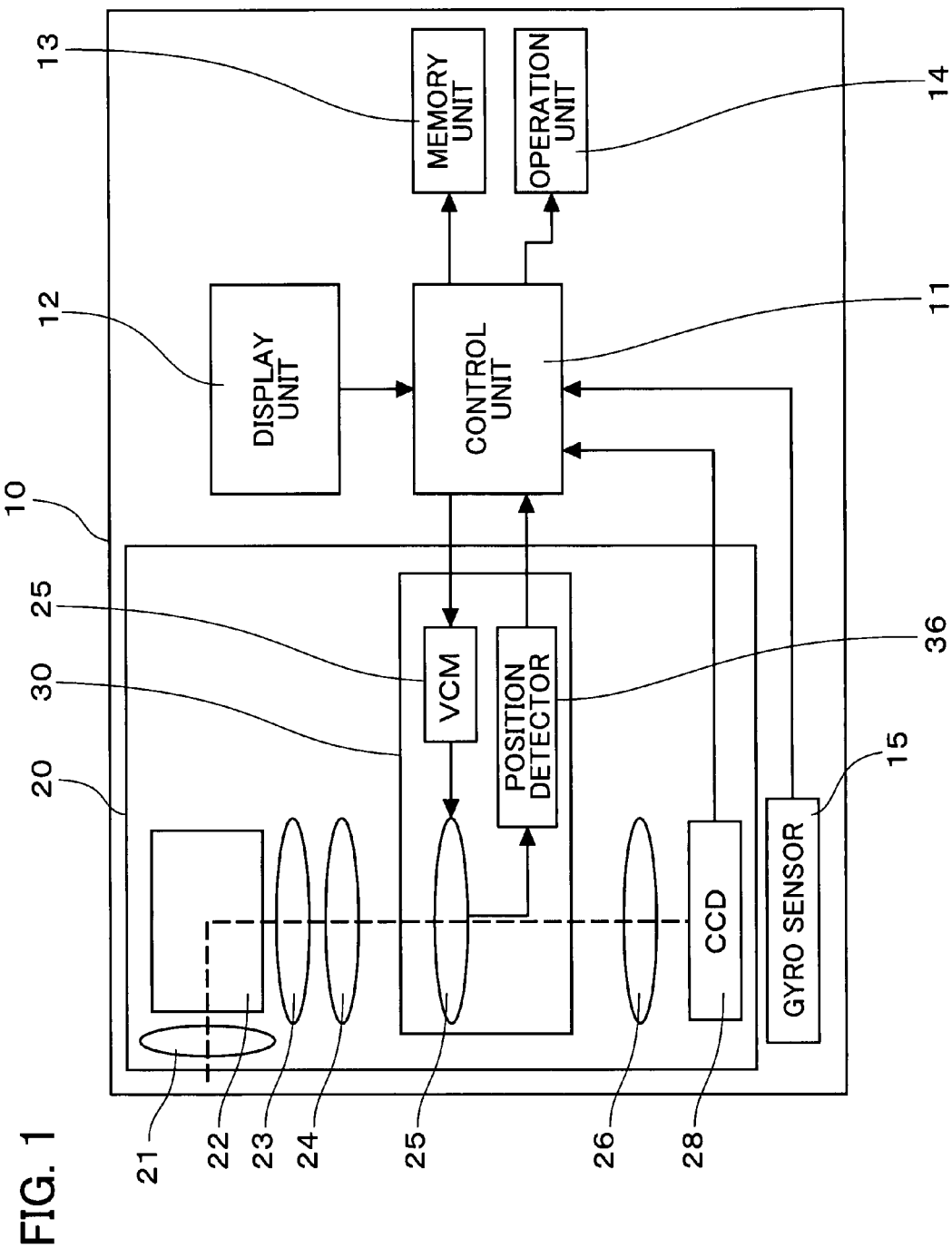
FIG. 1 is a block diagram showing an embodiment of a camera as a whole in accordance with the present invention.

In the following, referring to the drawings, an embodiment of the present invention is described in more detail.

Figure 2:
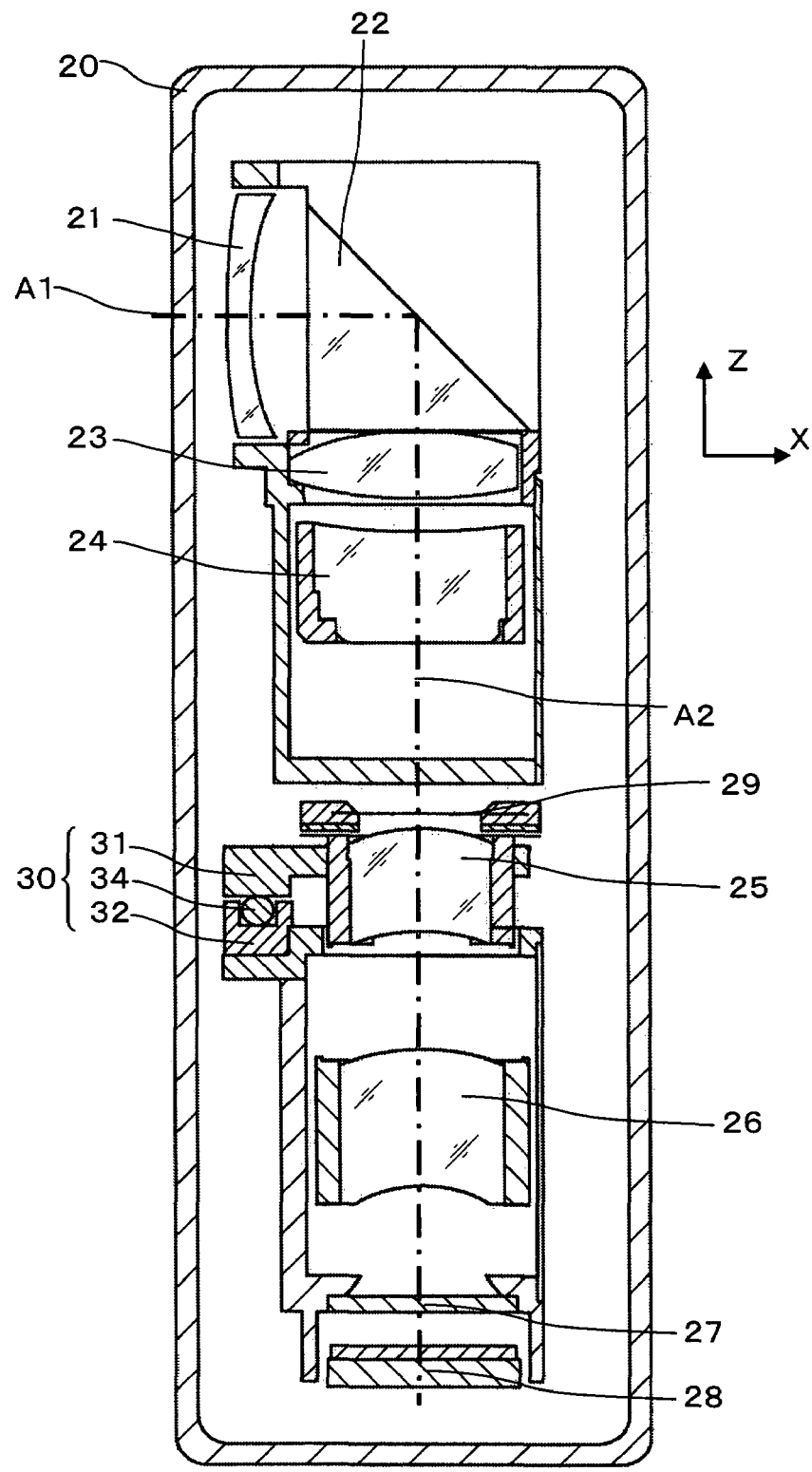
FIG. 2 shows a lens barrel unit of the camera in accordance with the present invention.
Figure 3:
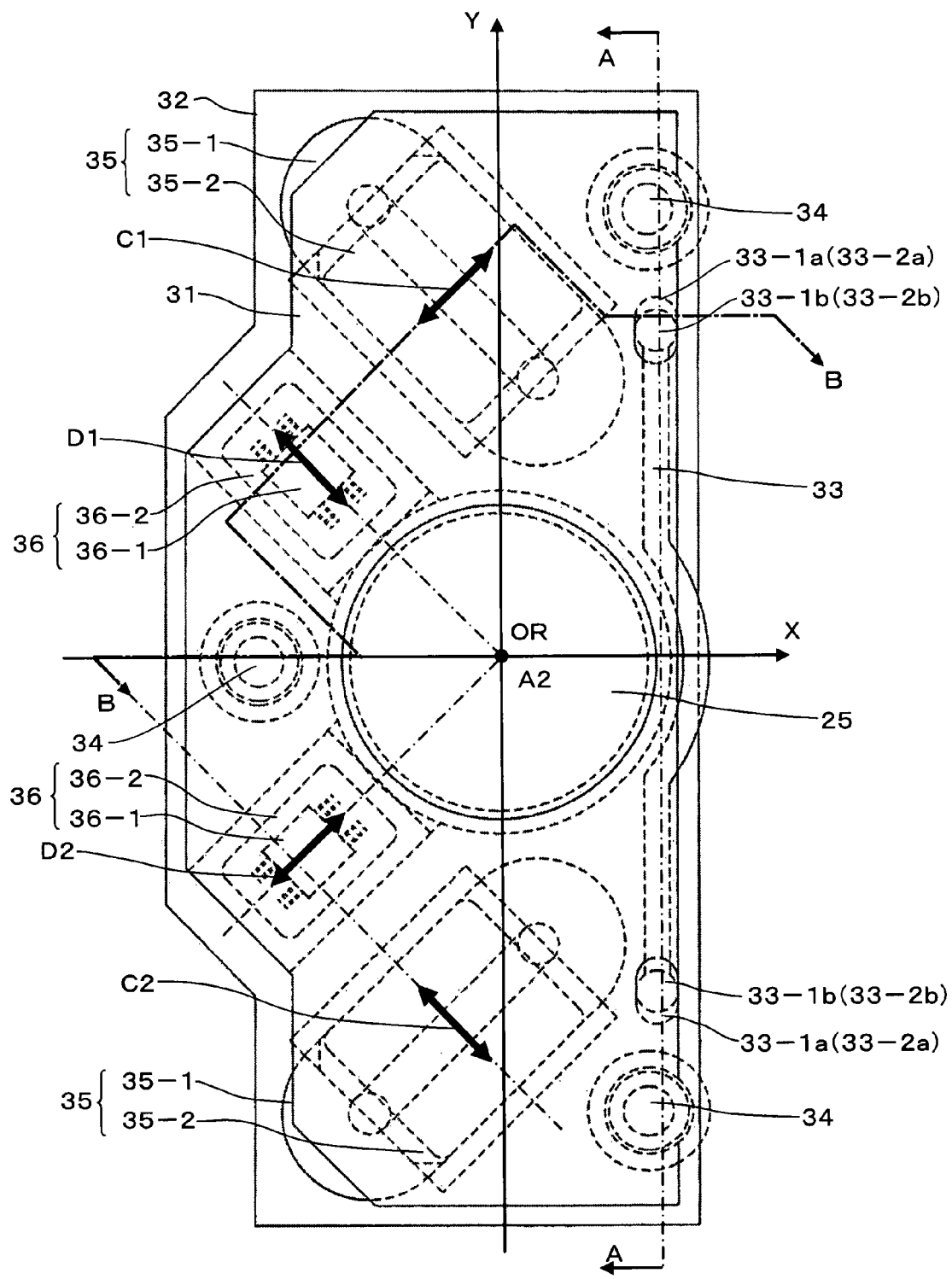
FIG. 3 shows a vibration reduction mechanism of the camera in accordance with the present invention.
Figure 4:
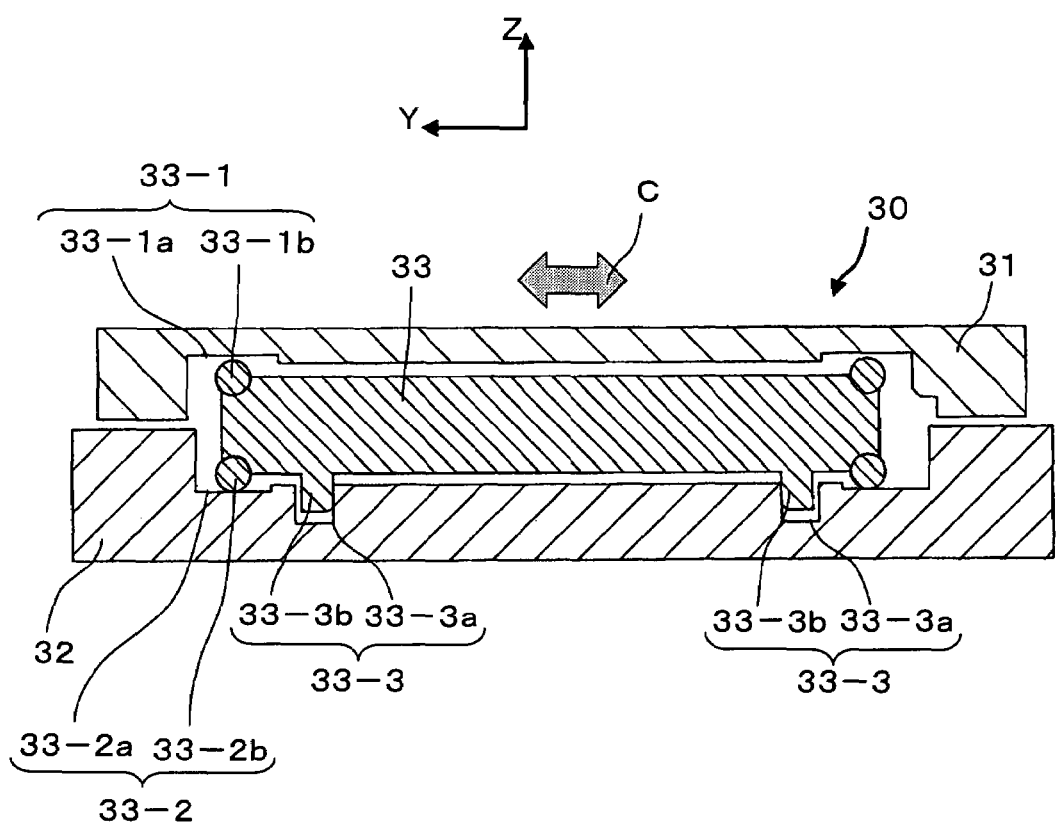
FIG. 4 is an A-A cross sectional view of the vibration reduction mechanism of the camera in accordance with the present invention.
Figure 5A:
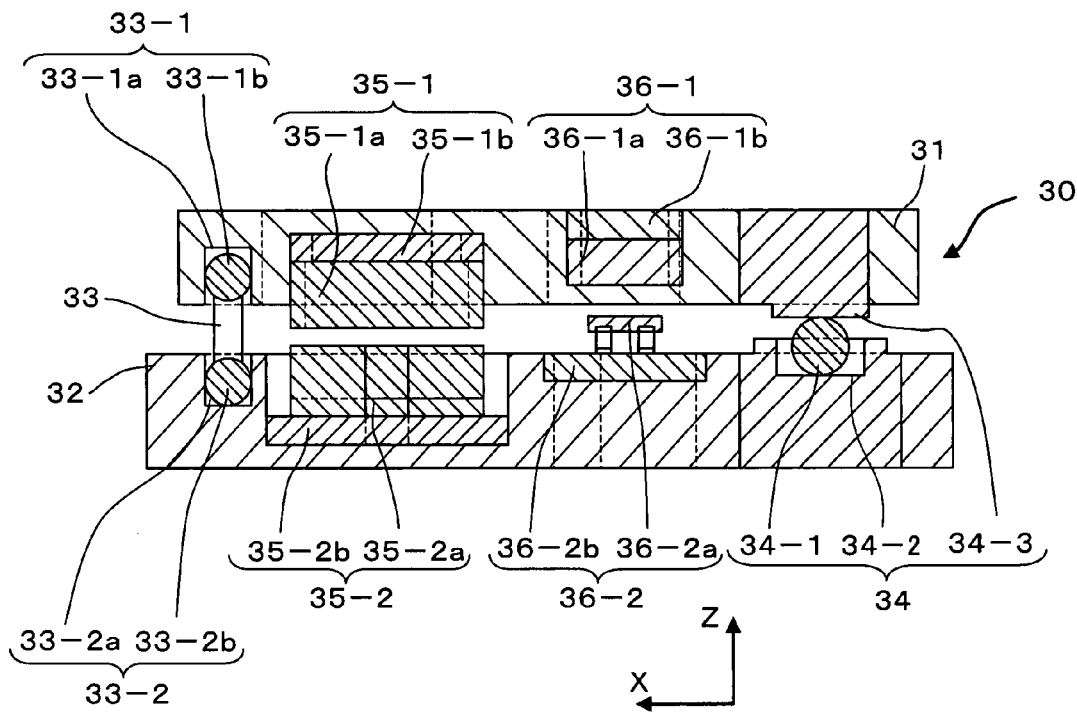
FIG. 5A and FIG. 5B show a B-B cross sectional view of the vibration reduction mechanism of the camera in accordance with the present invention.
Figure 5B:
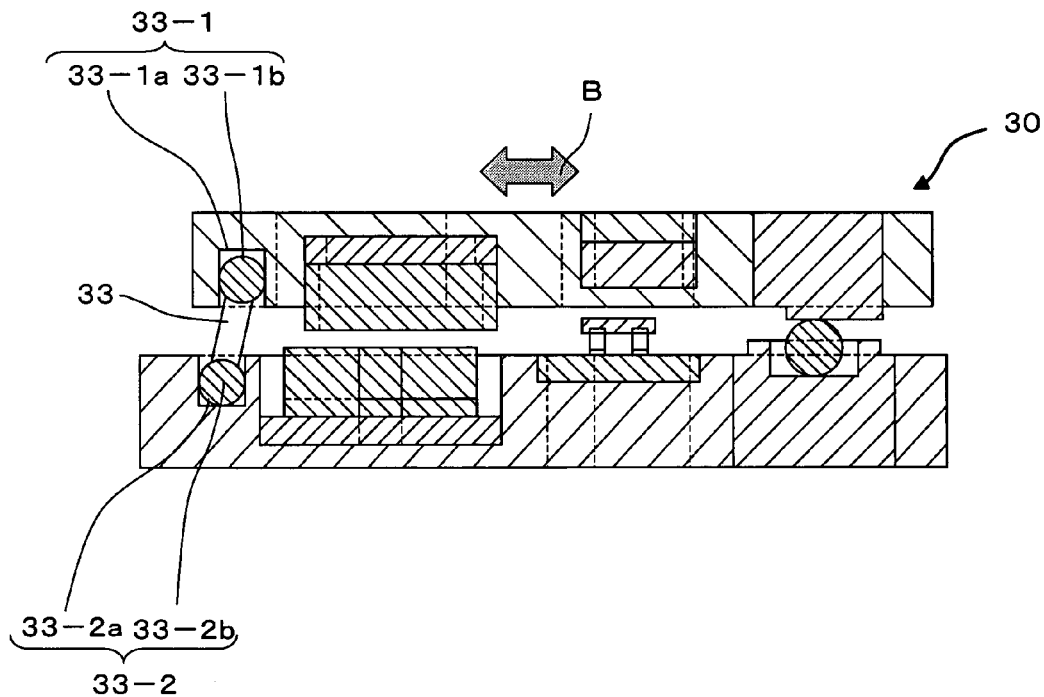
Figure 6:
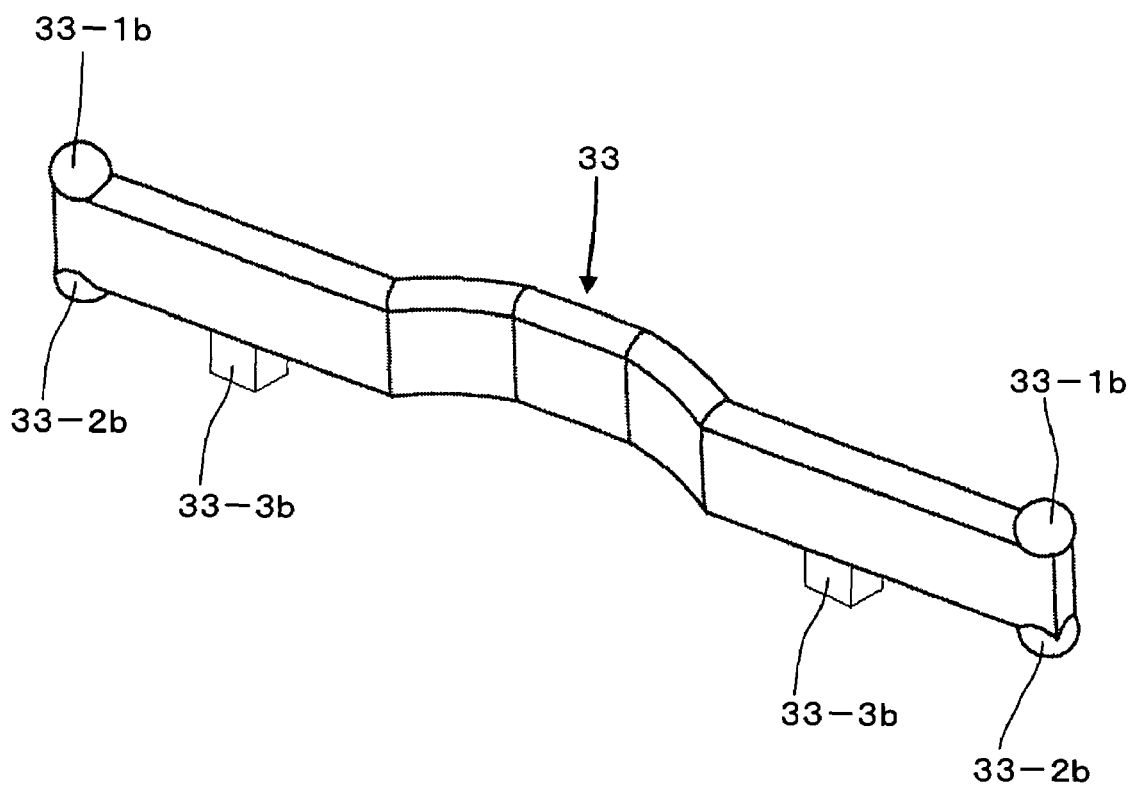
FIG. 6 is a perspective view of a guide member of the vibration reduction mechanism in accordance with the present invention.

FIG. 1 is a block diagram showing an embodiment of a camera as a whole in accordance with the present invention. FIG. 2 shows a lens barrel unit of the camera. FIG. 3 is a plain view showing a vibration reduction mechanism provided in a lens barrel unit. FIG. 4 is an A-A cross sectional view of FIG. 3. FIG. 5A and FIG. 5B show a B-B cross sectional view of FIG. 3. FIG. 6 is a perspective view of a guide member of the vibration reduction mechanism. For clarity, in FIG. 2 through FIG. 5B, the direction of light A1 which incidents to the camera 10 from a subject is shown as X direction, while the direction of the light A2 orthogonal to the light A1 is shown as the Z direction. Further, the Y direction is orthogonal both to the X direction and Z direction.

A camera 10 as shown in FIG. 1 is a digital camera including: a control unit 11; a display unit 12; a memory unit 13; an operation unit 14; a gyro sensor 15; a lens barrel unit 20; and a vibration reduction mechanism unit 30.

The control unit 11 is a CPU to supervise and control each unit of the camera 10, and further has a function to control the after-mentioned vibration reduction mechanism unit 30 in response to an output signal from a position detector 36 of the vibration reduction mechanism unit 30 and the gyro sensor 15.

The display unit 12 is, for example, a liquid crystal display to display the images photographed by the camera 10 and the operating information.

The memory unit 13 is a memory to store the image data photographed by the camera 10 and the operation data in the camera 10 and so on.

The operation unit 14 includes a plurality of operation buttons to set up the photographing operations and photographing conditions for the camera 10, thereby executing operations such as an operation of an after-mentioned shutter diaphragm mechanism unit 29 (cf. FIG. 2), and a zoom operation to drive a third lens unit 24 and a fifth lens unit 26 (cf. FIG. 2).

The gyro sensor 15 is a sensor to detect an angular velocity of the camera 10. The gyro sensor 15 detects movement (blurring caused by hand) thereby correcting the image blur caused by hand shake by means of the vibration reduction mechanism unit 30. The gyro sensor 15 includes two angular velocity sensors, each of which detects a pitching angular velocity (a rotation about the Y axis) and a yawing angular velocity (a rotation about the X axis).

The lens barrel unit 20 as shown in FIG. 1 and FIG. 2 has: a first lens unit 21; a prism 22; a second lens unit 23; a third lens unit 24; a fourth lens unit 25; a fifth lens unit 26; a low pass filter 27; a CCD 28; a shutter diaphragm mechanism unit 29; and the vibration reduction mechanism unit 30.

The first lens unit 21 is an objective lens upon which the light from the subject is incident, and the first lens unit 21 is the lens which is the nearest to the subject among the lens units in the lens barrel unit 20.

The prism 22 is a rectangular prism to deflect by 90 degrees the incident light, whereby the light A1 along the +X direction exits from the first lens unit 21 is totally reflected and is deflected by 90 degrees, and the light A2 along the −Z direction exits toward the second lens unit 23.

The second lens unit 23 is disposed at a position upon which the light A2 exiting from the prism 22 is incident.

The third lens unit 24 is disposed at a position upon which the light A2 exiting from the second lens unit 23 is incident. Further, the third lens unit 24 can be moved to any position along the Z direction by a driving mechanism (not shown).

The forth lens unit 25 is disposed, in a movable frame 31 of the vibration reduction mechanism unit 30, at a position upon which the light A2 exiting from the third lens unit 24 is incident.

The fifth lens unit 26 is disposed at a position upon which the light A2 exiting from the forth lens unit 25 is incident. Further, the fifth lens unit 26, similarly to the third lens unit 24, can be moved to any positions along the Z direction by a driving mechanism (not shown).

The low pass filter 27 is a filter to pass only a signal of a frequency less than or equal to a prescribed frequency, the low pass filter 27 being provided between the fifth lens unit 26 and the CCD 28 (cf. FIG. 2), thereby preventing moire fringes of the image signal output from the CCD 28.

The CCD (Charge-Coupled Device) 28 is a solid state image pick-up device provided at the exit side of the fifth lens unit 26 which can output an electrical image signal based on the light from the subject focused on the image pick-up surface.

The shutter diaphragm mechanism unit 29 is disposed at the incident side of the fourth lens unit 25 of the vibration reduction mechanism unit 30. The shutter diaphragm mechanism unit 29 is provided with: a diaphragm portion to regulate a quantity of the subject light passing through the lens barrel unit 20; and a shutter unit to adjust the exposure time exposing the CCD 28 for the subject light.

The vibration reduction mechanism unit 30 as shown in FIG. 3 has: a movable frame (a first moving member) 31; a fixed frame (a second moving member) 32; a guide member 33; first engagement portions 33-1; second engagement portions 33-2; regulation portions 33-3; a support portion 34; voice coil motors (VCMs) 35; and position detectors 36. The movable frame 31 holding the forth lens unit 25 is moved, by means of driving sources of the VCMs 35 as an actuator, in the plane (XY plane) orthogonal to the light A2, thereby reducing the image blur caused by the movement of the camera 10 (hand blurring).

The movable frame 31 holds the fourth lens unit 25 at the center of the movable frame 31, and is movable in the XY plane relative to the fixed frame 32. Further, there are provided, in the movable frame 31, on the surface opposite to the fixed frame 32, two groove-shaped portions 33-1a having an elongated hole shape, each of which forms a part of the after-mentioned first engagement portions 33-1. The two groove-shaped portions 33-1a are spaced at a sufficient distance.

The fixed frame 32 is provided, at its center, with an opening for the light A2 exiting from the fourth lens unit 25 to pass through and fixed with the lens barrel unit 20. There are provided, in the fixed frame 32, on the surface opposite to the movable frame 31, two groove-shaped portions 33-2a having an elongated hole shape, each of which forms a part of the after-mentioned second engagement portions 33-2. The two groove-shaped portions 33-2a are spaced at a sufficient distance. Further, there are provided, at the above-mentioned same surface of the fixed frame 32, two concave portions 33-3a, each of which forms a part of the after-mentioned regulation portions 33-3.

The guide member 33 as shown in FIG. 4 through FIG. 6 is a member elongating along the Y direction, and is disposed between the movable frame 31 and the fixed frame 32. There are provided spherically-shaped portions 33-1b each of which forms a part of the after-mentioned first engagement portions 33-1, at the two positions on a side (the upper side) of both edge of the guide member 33 opposite to the movable frame 31. Similarly, there are provided spherically-shaped portions 33-2b each of which forms a part of the after-mentioned second engagement portions 33-2, at the two positions on another side (the lower side) of guide member 33 opposite to the fixed frame 32. Further, there are provided, at an edge of the guide member 33 facing to the fixed frame 32, convex portions 33-3b each of which forms a part of the after-mentioned regulation portion 33-3, at the two positions spaced by an equal distance from the center of the longitudinal direction (the Y direction).

The first engagement portions 33-1 have: the groove-shaped portions 33-1a; and the spherically-shaped portions 33-1b. The first engagement portions 33-1 form a mechanism to guide the movable frame 31 and the guide member 33 by engaging the groove-shaped portions 33-1a with the spherically-shaped portions 33-1b. Therefore, both the groove-shaped portions 33-1a and the spherically-shaped portions 33-1b are disposed at the corresponding positions opposite to the movable frame 31 and the guide member 33, respectively, so as to be engaged with each other. The groove-shaped portions 33-1a are elongated holes extending in the Y direction in the movable frame 31.

Similarly to the first engagement portions 33-1, the second engagement portions 33-2 have: the groove-shaped portions 33-2a; and the spherically-shaped portions 33-2b, thereby guiding the fixed frame 32 and the guide member 33 by engaging the groove-shaped portions 33-2a with the spherically-shaped portions 33-2b. Therefore, the groove-shaped portions 33-2a and the spherically-shaped portions 33-2b are disposed at the corresponding positions opposite to the fixed frame 32 and the guide member 33, respectively, so as to be engaged with each other. The groove-shaped portions 33-2a are elongated holes extending along the Y direction in the fixed frame 32.

The regulation portions 33-3 as shown in FIG. 4 form a mechanism to regulate the guide member 33 so as not to move relatively to the fixed frame 32 along the Y direction. The regulation portions 33-3 having: the concave portions 33-3a provided on a surface of the fixed frame 32; and the convex portions 33-3b provided on a lower surface of the guide member 33. The concave portions 33-3a and the convex portions 33-3b are disposed at the corresponding positions opposite to the fixed frame 32 and the guide member 33, respectively, so as to be engaged with each other.

The guide member 33 is integral moulded element, wherein the spherically-shaped portions 33-1b, spherically-shaped portions 33-2b and the convex portions 33-3b are integrally moulded. Further, the first engagement portions 33-1 and the second engagement portions 33-2 are provided around the voice coil motors 35 which is the action point of the force, in order for the guide member 33 to efficiently work relative to the movable frame 31 and the fixed frame 32.

In accordance with the above-explained structure, the movable frame 31 as shown in FIG. 5B moves toward the X direction (as shown by the arrow B) relatively to the fixed frame 32 in such a manner that the guide member 33 inclines toward the X direction by means of both the first engagement portions 33-1 and the second engagement portion 33-2. Further, as shown in FIG. 4, the movable frame 31 can move toward the Y direction (as shown by the arrow C) by means of the elongated hole groove-shaped portions 33-1a of the first engagement portions 33-1. Further, as shown in FIG. 3, the two sets of the groove-shaped portions 33-1a and the spherically-shaped portions 33-1b are spaced at a sufficient distance, and similarly, the two sets of the groove-shaped portions 33-2a and the spherically-shaped portions 33-2b are separated at a sufficient distance. Therefore, the movable frame 31 moves, without rotating itself around the fixed frame 32, and while holding it orientation constant. Further, the regulation portions 33-3 prevent the guide member 33 from independently moving between the movable frame 31 and the fixed frame 32.

The support portion 34, as shown in FIG. 5A, is a rolling mechanism provided with: a steel ball 34-1; a cup-shaped sphere receiving portion 34-2; and a flat portion 34-3, whereby the steel ball 34-1 is held between the sphere receiving portion 34-2 provided at the fixed frame 32 and the flat portion 34-3 provided at the movable frame 31. This mechanism makes the movable frame 31 movable in the XY plane, holding constant its position along the Z direction.

Each of the voice coil motors 35 as shown in FIG. 3 and FIG. 5A is a non-contact type electromagnetic actuator provided with: a magnet portion 35-1; and a coil portion 35-2, thereby linearly driving the fourth lens unit 25 in response to driving instructions and capable of responding at a high speed. The voice coil motors 35 are disposed at the two positions in lines symmetrical about the X axis passing through the center OR of the fourth lens unit 25 in the movable frame 31. The driving directions (the arrow C1 and the arrow C2) of the VCMs 35 are inclined by 45 degrees to the X direction, and the intersection point of the arrow C1 and the arrow C2 lies on the X axis passing through the center OR of the fourth lens unit 25.

The magnet portion 35-1 is a magnetic circuit having: a permanent magnet 35-1a; and a yoke 35-1b.

The coil portion 35-2 is a magnetic circuit having: a coil 35-2a as an armature winding wire; and a yoke 35-2b.

The position detectors 36 is provided with: a magnet portion 36-1; and a detection portion 36-2, whereby, by detecting a magnetic field change between the magnet portion 36-1 and the detection portion 36-2, the displacement by the movement of the movable frame 31 is detected. The position detectors 36 are disposed at the two positions in lines symmetrical about the X axis passing through the center OR of the fourth lens unit 25 of the movable frame 31. The detecting directions (the arrow D1 and the arrow D2) of the position detectors 36 are inclined by 45 degrees to the X direction and the intersection point of each of the detecting directions (the arrow D1 and the arrow D2) lies on the X axis passing through the center OR of the fourth lens unit 25.

The magnet portion 36-1 is a magnetic circuit having: a permanent magnet 36-1a; and a yoke 36-1b.

The detection portion 36-2 is a magnetic circuit having: a Hall device 36-2a; and a yoke 36-2b.

Next, the operation of the camera 10 and the vibration reduction mechanism unit 30 are described.

The camera 10 as shown in FIG. 1 displays the subject image on the display unit 12 through the lens barrel unit 20 and takes the photographs of the subject by means of the operation unit 14. The lens barrel unit 20 makes the subject light incident on the first lens unit 21, deflects the subject light by 90 degrees by the prism 22, and focuses the subject light on the CCD 28 through from the second lens 23 to the fifth lens unit 26. When a user pushes the shutter button, the control unit 11 operates the vibration reduction mechanism 30, whereby the image blur due to hand shake caused by the user and so on is corrected.

The image blur correction unit 30 executes, based on the angular velocity data of the orientation change of the camera 10 detected by the gyro sensor 15, and on the position data of the movable frame 31 relative to the fixed frame 32 detected by the position detector 36, the control to correct the image blur caused by the hand shake of the camera 10, and the optimal management of the relative position between the center portion of the fourth lens unit 25 and the light A2. In accordance with this mechanism, the photographs of the subject can be clearly taken without being affected by external disturbances such as camera shake on the camera 10.

As explained above, the camera 10 of the present invention has the following advantages.

(1) The first engagement portions 33-1 and the second engagement portions 33-2 engaged with the sphere-shaped portions 33-1b and 33-2b and the elongated hole groove portions 33-1a and 33-2a are provided both between the guide member 33 and the movable frame 31 and between the guide member 33 and the fixed frame 32. Therefore, the movable frame 31 and the fixed frame 32 can be relatively moved along the two axial directions (the XY direction), with a simple structure, without any relative rotation, with a constant orientation, and with high accuracy.

(2) The spherically-shaped portions 33-1b and 33-2b of the first engagement portions 33-1 and the second engagement portions 33-2 are formed integrally with the guide member 33. Therefore, any errors that may arise from these being separate parts are resolved, and the accuracy of the driving control of the vibration reduction mechanism unit 30 can be improved. Further, the manufacturing cost can be reduced, because the spherically-shaped portions 33-1*b* and 33-2*b* and the guide member 33 can be integrally moulded.

(3) There are provided, between the fixed frame 32 and the guide member 33, the regulation portions 33-3 to regulate the relative movements of the fixed frame 32 and the guide member 33, along the Y direction. Therefore, the guide member 33 can be prevented from independently moving between the movable frame 31 and the fixed frame 32, thereby improving the control characteristics and the accuracy of driving the vibration reduction mechanism unit 30.

Modified Embodiments

The present invention is not limited to the above-explained embodiment. Various modifications and changes can be made.

(1) In the above-explained embodiment, the regulation portions 33-3 are provided between the fixed frame 32 and the movable frame 31. However, the regulation portion 33-3 may be provided between the movable frame 31 and the guide member 33.

(2) In the above-explained embodiment the spherically-shaped portions 33-1*b* and 33-2*b* are employed for the first engagement portions 33-1 and the second engagement portions 33-2, respectively. However, cylindrically-shaped portions may be employed instead, with the condition that the center line of the cylinder is directed along the Y direction.

(3) In the above-explained embodiment, the spherically-shaped portions 33-1*b* and 33-2*b* are formed in the guide member 33, while the groove-shaped portions 33-1*a* and 33-2*a*, are formed in the movable frame 31 and in the fixed frame 32; however, the groove-shaped portions 33-1*a* and 33-2*a* may be formed, in the guide member 33, while the spherically-shaped portions 33-1*b* and 33-2*b*, respectively may be formed in the movable frame 31 and in the fixed frame 32.

What is claimed is:

1. A vibration reduction mechanism, comprising:
   a movable frame and a fixed frame which move relatively at a time of a blur correction;
   a guide member which is elongated in a first direction perpendicular to an optical axis, and which guides a relative movement of the movable frame and the fixed frame;
   a plurality of first engagement portions, spaced relative to each other along the first direction, to engage the movable frame and the guide member, each first engagement portion having
      a first guide member part provided at a movable frame side of the guide member, and having one of a spherical surface portion or a cylindrical surface portion and a groove portion, and
      a movable frame part provided on the movable frame at a position corresponding to the first guide member part, the movable frame part having one of a spherical surface portion or a cylindrical surface portion and a groove portion, other than the first guide member part; and
   a plurality of second engagement portions, spaced relative to each other along the first direction, to engage the fixed frame with the guide member, each second engagement portion having
      a second guide member part provided at a movable frame side of the guide member and having one of a spherical surface portion or a cylindrical surface portion and a groove portion, and
      a fixed frame part provided on the fixed frame at a position corresponding to the second guide member part and having one of a spherical surface portion or a cylindrical surface portion and a groove portion, other than the second guide member part, wherein groove portions of at least either one of the plurality of the first engagement portions or the plurality of the second engagement portions are formed with an elongated hole shape extending along the first direction.

2. The vibration reduction mechanism according to claim 1, wherein the first guide member part of the first engagement portions and the second guide member part of the second engagement portions are integrally formed with the guide member.

3. The vibration reduction mechanism according to claim 1, further comprising
   a regulation portion provided at a position other than locations of any of the first engagement portions and the second engagement portions, between the movable frame or the fixed frame and the guide member, to regulate the relative movement along the first direction.

4. The vibration reduction mechanism according to claim 2, further comprising
   a regulation portion provided at a position other than locations of any of the first engagement portions and the second engagement portions, between the movable frame or the fixed frame and the guide member, to regulate the relative movement along the first direction.

5. An optical device, comprising:
   the vibration reduction mechanism according to claim 1.

6. The vibration reduction mechanism according to claim 1, wherein:
   the guide member is configured to allow an inclination in a second direction perpendicular to the optical axis and the first direction; and
   the relative movement between the movable frame and the fixed frame in the second direction is determined by the inclination.

7. A vibration reduction mechanism, comprising:
   a first member and a second member which move relatively to achieve a blur correction when a blur occurs due to vibration;
   a guide member which is elongated in a first direction perpendicular to an optical axis, and which guides a relative movement of the first member and second member;
   the guide member having
      a plurality of first projections provided at a first member side of the guide member, the first projections being spaced with respect to each other along the first direction, and
      a plurality of second projections provided at a second member side of the guide member, the second projections being spaced with respect to each other along the first direction,
   the first member having first groove portions engaging with the first projections and provided at positions corresponding to the first projections,
   the second member having second groove portions engaging with the second projections and provided at positions corresponding to the second projections,
   wherein at least one of the first groove portions or the second groove portions is formed with an elongated hole shape extending along the first direction.

8. The vibration reduction mechanism according to claim 6, wherein:
the first projections and the second projections have any one of a spherical surface or a cylindrical surface.

9. The vibration reduction mechanism according to claim 7, wherein:
the guide member is configured to allow an inclination in a second direction perpendicular to the optical axis and the first direction, and
the relative movement along the second direction between the first member and the second member is determined by the inclination.

10. The vibration reduction mechanism according to claim 7, wherein:
the guide member is configured to be able to move along at least one of the first groove portion and the second groove portion formed with an elongated hole shape extending along the first direction.

11. The vibration reduction mechanism according to claim 7, further comprising:
a regulation portion provided between the guide member and the second member to regulate the relative movement along the first direction.

12. A vibration reduction mechanism, comprising:
a first member and a second member which move relatively to achieve a blur correction when a blur occurs due to vibration;
a guide member which is elongated in a first direction perpendicular to an optical axis, and which guides a relative movement of the first member and the second member;
the guide member having
a plurality of first groove portions provided at a first member side of the guide member, the first groove portions being spaced with respect to each other along the first direction, and
a plurality of second groove portions provided at a second member side of the guide member, the second groove portions being spaced with respect to each other along the first direction;
the first member having first projections engaging with the first groove portions and provided at positions corresponding to the first groove portions;
the second member having second projections engaging with the second groove portions and provided at positions corresponding to the second groove portions,
wherein at least one of the first groove portions or the second groove portions are formed with an elongated hole shape extending along the first direction.

13. The vibration reduction mechanism according to claim 12, wherein:
the first projections and the second projections have one of a spherical surface or cylindrical surface.

14. A vibration reduction mechanism, comprising:
a first member and a second member which move relatively achieve a blur correction when the blur occurs due to vibration;
a guide member which is elongated in a first direction perpendicular to an optical axis, and which guides a relative movement of the first member and the second member;
first engagement portions spaced relative to each other along the first direction, each first engagement portion having
a first guide member part provided at a first member side of the guide member, and having one of a projection or a groove portion, and
a first member part provided on the first member at a position corresponding to the first guide member, the first member part having another one of a projection or a groove portion than the first guide member part; and
second engagement portions spaced relative to each other along the first direction, to engage the second member with the guide member, each second engagement portion having
a second guide member part provided at a second member side of the guide member and having one of a projection or a groove portion, and
a second member part provided on the second member and having another one of a projection or a groove portion than the second guide member,
wherein groove portions of at least one of the first engagement portion or the second engagement portion are formed with an elongated hole shape extending along the first direction.

15. The vibration reduction mechanism according to claim 14, wherein:
the guide member is configured to allow an inclination in a second direction perpendicular to the optical axis and the first direction; and
the relative movement between the first member and the second member along the second direction is determined by the inclination.

16. The vibration reduction mechanism according to claim 14, wherein:
the guide member is configured to allow moving along the groove portion formed along at least one of the first engagement portion or the second engagement portion formed with an elongated hole shape extending along the first direction.

17. The vibration reduction mechanism according to claim 1, wherein:
a length of the guide member along the first direction is longer than a length of the guide member along the optical axis and a length of the guide member in a direction perpendicular to the first direction and the optical axis.

18. The vibration reduction mechanism according to claim 7, wherein:
a length of the guide member along the first direction is longer than a length of the guide member along the optical axis and a length of the guide member in a direction perpendicular to the first direction and the optical axis.

19. The vibration reduction mechanism according to claim 12, wherein:
a length of the guide member along the first direction is longer than a length of the guide member along the optical axis and a length of the guide member in a direction perpendicular to the first direction and the optical axis.

20. The vibration reduction mechanism according to claim 14, wherein:
a length of the guide member along the first direction is longer than a length of the guide member along the optical axis and a length of the guide member in a direction perpendicular to the first direction and the optical axis.

21. An optical device comprising the vibration reduction mechanism according to claim 7.

22. An optical device comprising the vibration reduction mechanism according to claim 12.

23. An optical device comprising the vibration reduction mechanism according to claim 14.

* * * * *

UNITED STATES PATENT AND TRADEMARK OFFICE
CERTIFICATE OF CORRECTION

PATENT NO.       : 7,742,692 B2
APPLICATION NO.  : 11/907290
DATED            : June 22, 2010
INVENTOR(S)      : Junichi Omi It is certified that error appears in the above-identified patent and that said Letters Patent is hereby corrected as shown below:

Column 9, Lines 1-2 in Claim 8 please remove "according to claim 6," and insert -- according to claim 7, --, therefor.

Signed and Sealed this
Nineteenth Day of July, 2011

David J. Kappos
*Director of the United States Patent and Trademark Office*